United States Patent [19]
Kosako

[11] Patent Number: 5,548,365
[45] Date of Patent: Aug. 20, 1996

[54] VIEW FINDER OF CAMERA

[75] Inventor: Kosei Kosako, Tokyo, Japan

[73] Assignee: Asahi Kogaku Kogyo Kabushiki Kaisha, Tokyo, Japan

[21] Appl. No.: 150,864

[22] Filed: Nov. 12, 1993

[30] Foreign Application Priority Data

Jan. 18, 1993 [JP] Japan .................... 5-000922 U

[51] Int. Cl.⁶ .................... G03B 13/02
[52] U.S. Cl. .................... 354/219; 354/289.1; 354/224
[58] Field of Search .................... 354/219, 222, 354/224, 225, 289.1

[56] References Cited

U.S. PATENT DOCUMENTS

| | | | |
|---|---|---|---|
| 4,171,896 | 10/1979 | Sato et al. | 354/225 |
| 4,348,091 | 9/1982 | Iizuka | 354/225 |
| 4,716,429 | 12/1987 | Misawa | 354/225 |
| 4,944,030 | 7/1990 | Haraguchi et al. | |
| 4,977,425 | 12/1990 | Yamamoto et al. | |

*Primary Examiner*—Monroe H. Hayes
*Attorney, Agent, or Firm*—Greenblum & Bernstein P.L.C.

[57] ABSTRACT

A view finder of a camera, in which images of indication marks are observed through an eyepiece lens in a peripheral light intercepting portion of a field frame of a finder optical system. The view finder includes indicating members provided outside the field frame of the finder optical system. The indicating members have indication marks formed thereon for projection of the images of indication marks. The view finder further includes prisms which are located closer to the eyepiece of the view finder than the indicating members. The prisms have apexes protruding towards an optical axis of the finder optical system, such that light emitted from the indicating members is transmitted through the apexes of the prisms in order to shift the images of the indication marks closer towards the optical axis of the finder optical system.

13 Claims, 14 Drawing Sheets

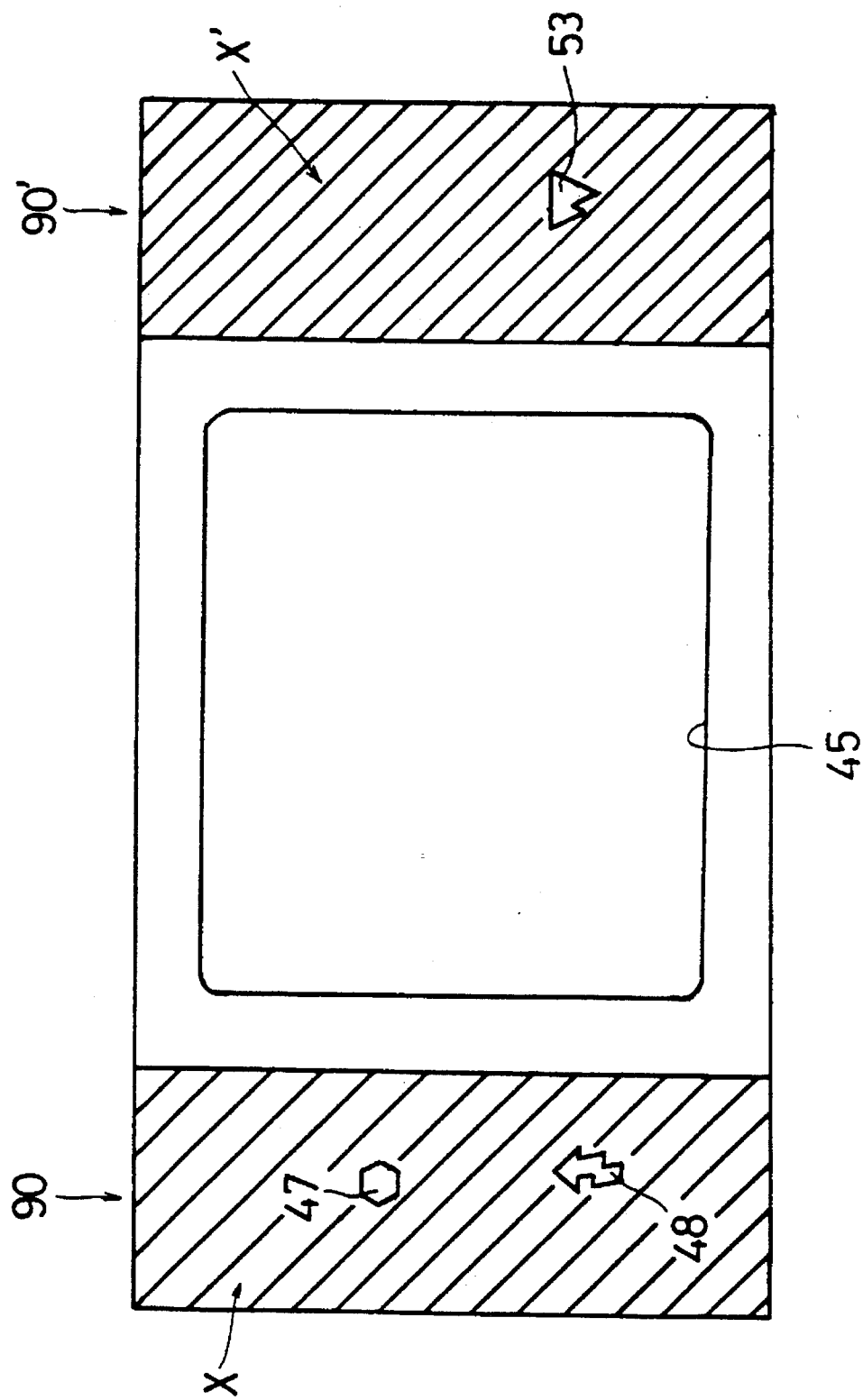

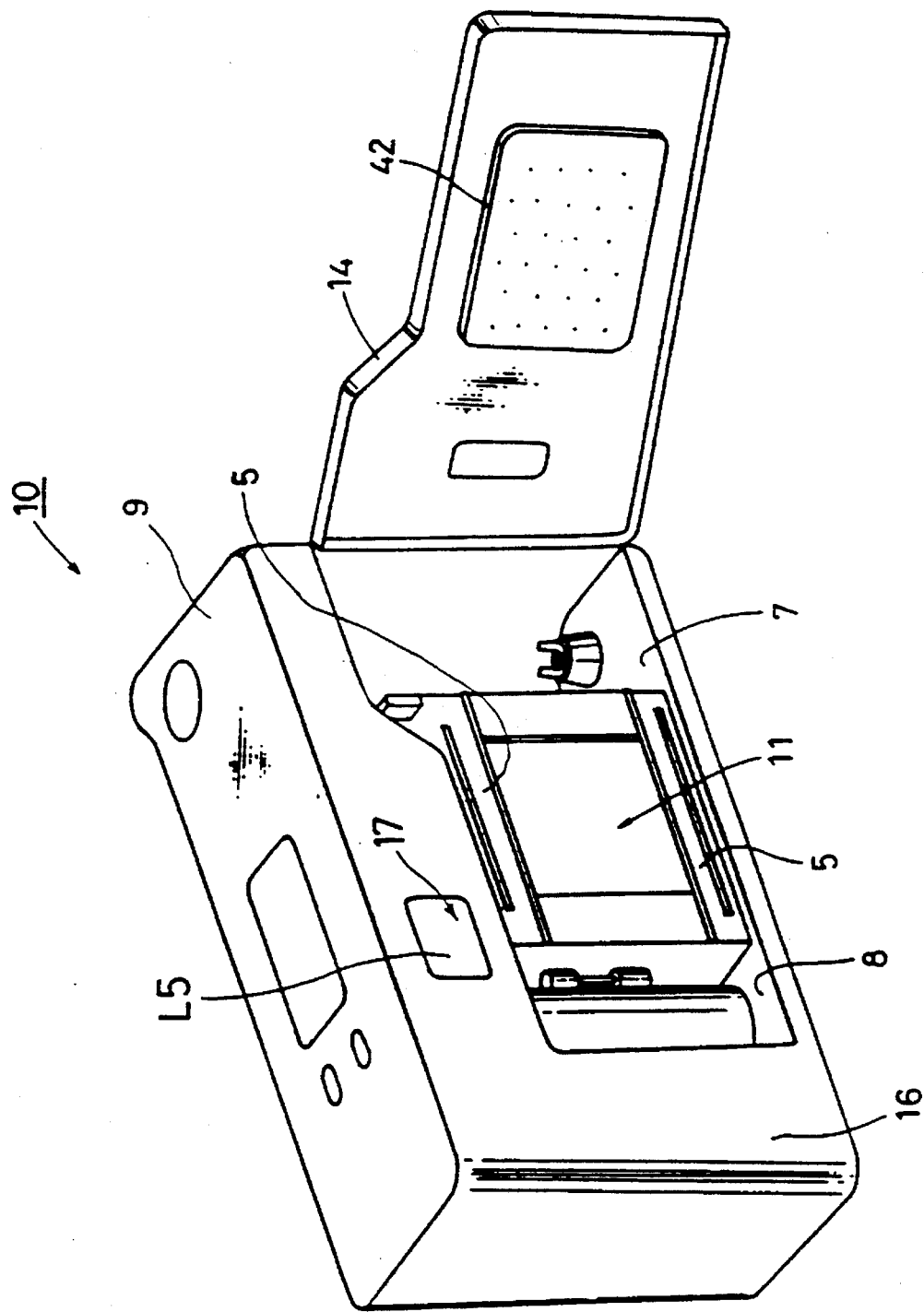

VIEW FINDER OF CAMERA

BACKGROUND OF THE INVENTION

1. Field of the Invention

The present invention relates to a view finder of a camera. More precisely, the invention relates to a view finder in which an indication mark together with an object image.

2. Description of Related Art

In a known view finder of a camera, indication marks, such as in-focus marks that indicate completion of focusing, or strobe marks that indicate the necessity of strobe light emission, are indicated in the field of view of the finder. In such a view finder, it is preferable that such indication marks be indicated on the peripheral light intercepting portion of the field frame, as close as possible to the field frame, to observe both the object image and the indication marks at the same time.

However, in practice, it is necessary to provide a light intercepting wall to prevent light emitted from a light emitter, such as an LED, from entering the finder optical system. Consequently, the proximity of the indication marks and the field frame is restricted by the presence of the light intercepting wall. Accordingly, a photographer must adjust his or her line of vision far away from the field frame, i.e., away from the object image within the field frame, to view the indication marks.

SUMMARY OF THE INVENTION

It is an object of the present invention to eliminate the drawback of the prior art by providing a view finder of a camera in which the indication marks are located near the center of the field frame.

To achieve the object mentioned above, according to the present invention, a view finder is provided in which an indication mark is observed through an eyepiece lens located in a peripheral light intercepting portion of field frame of a finder optical system. The view finder includes at least one indicating member provided outside the field frame of the finder optical system and having at least one indication mark for projection. The view finder further includes at least one prism, which is located closer to an eyepiece of the view finder than the indicating member, and which has an apex protruding towards an optical axis of the finder optical system, emitted light from the indicating member is transmitted through the apex of the prism so as to shift the image of the indication mark towards the optical axis of the finder's optical system.

Preferably, the view finder further includes a finder body which defines an optical path of the finder optical system, and at least one light emitter. The light emitter is provided on the peripheral light intercepting, portion of the field frame of the finder optical system and emits light to project at least one indication mark of the indicating member.

Preferably, the prisms are positioned so as not to intercept a bundle of rays within the field frame of the finder optical system.

The indicating member can be provided with an array of indication marks which are formed by cut-away portions of the indicating member.

The prism can be secured to the finder body, and is preferably shaped such that the images of the array of indication marks can be received by the indication position varying prism.

The present disclosure relates to the subject matter contained in Japanese utility model application No. 5-922 (filed on Jan. 18, 1993) which is expressly incorporated herein by reference in its entirety.

BRIEF DESCRIPTION OF THE DRAWINGS

The invention will be described below in detail with reference to the accompanying drawings, in which;

FIG. 13 is a view of peripheral light intercepting portions, and indication marks located within the portions, from the eyepiece side; and.

FIG. 14 is rear isometric view of a camera to which the present invention is applied.

DESCRIPTION OF THE PREFERRED EMBODIMENT

Figure 1:
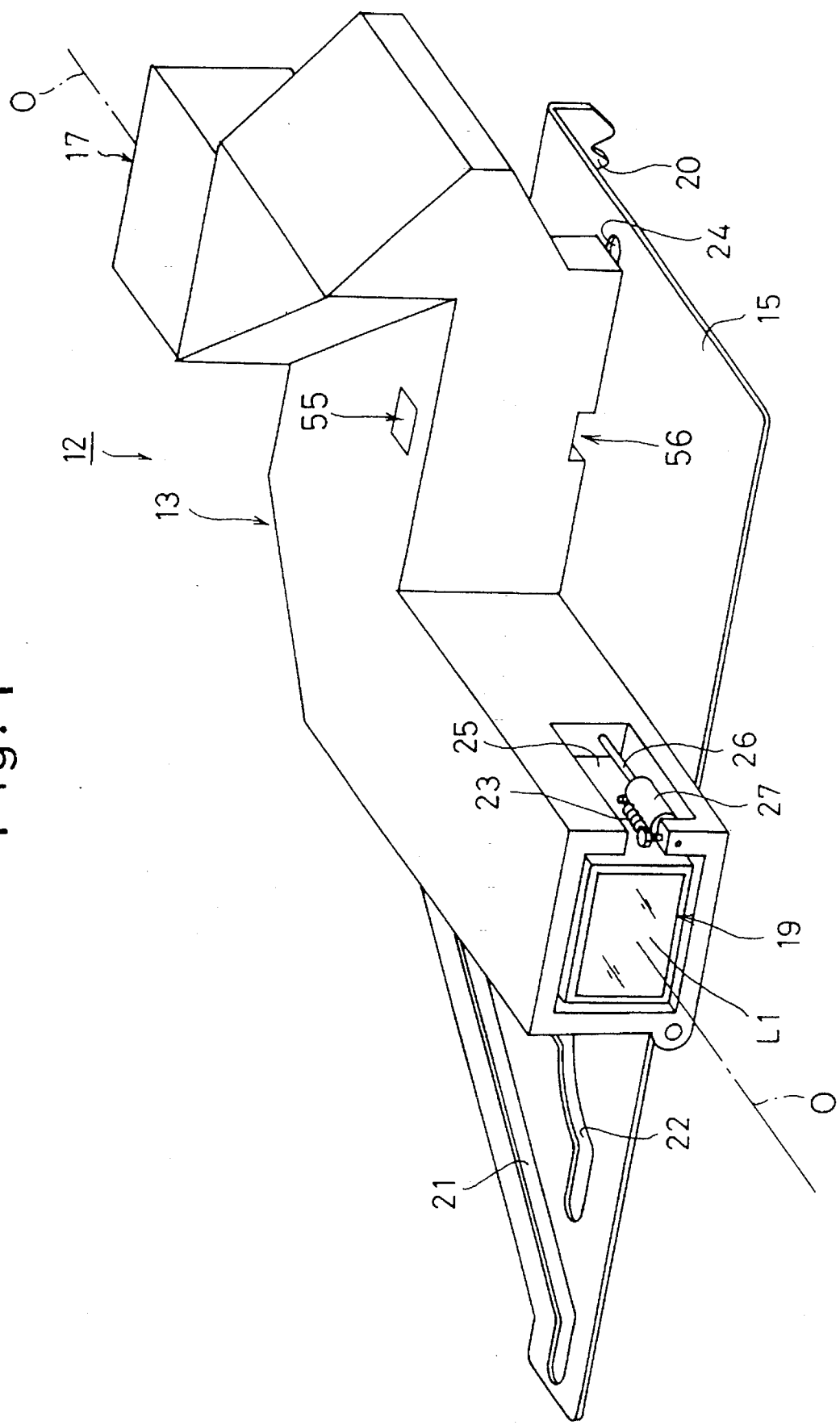
FIG. 1 is a perspective view of a zoom finder according to the present invention.

A lens shutter type camera 10 to which the present invention is applied will be discussed below with reference to FIG. 14.

The camera 10 has a camera body 9 in which a zoom photographing optical system (not shown) and a zoom finder optical system (FIG. 2) are provided. The camera body 9 is provided with a film compartment 7 and a film winding chamber 8 on right and left sides of the camera body. A photographing aperture 11, defined by upper and lower aperture frames 5 is provided between the film compartment 7 and the film winding chamber 8. A back cover 14, having a film keeping plate 42, is hinged to one end of a rear wall 16 of the camera body 9 to open and close the photographing aperture 11. The camera body 9 is provided, on the upper and middle portion of the rear wall 16 thereof, with a finder view window 17.

In FIG. 1, a real image type zoom finder 12 provided in the camera 10 includes the zoom finder optical system, which is separate from the zoom photographing optical system. The zoom finder 12 is provided with a finder body 13 and a cam plate 15.

Figure 2:
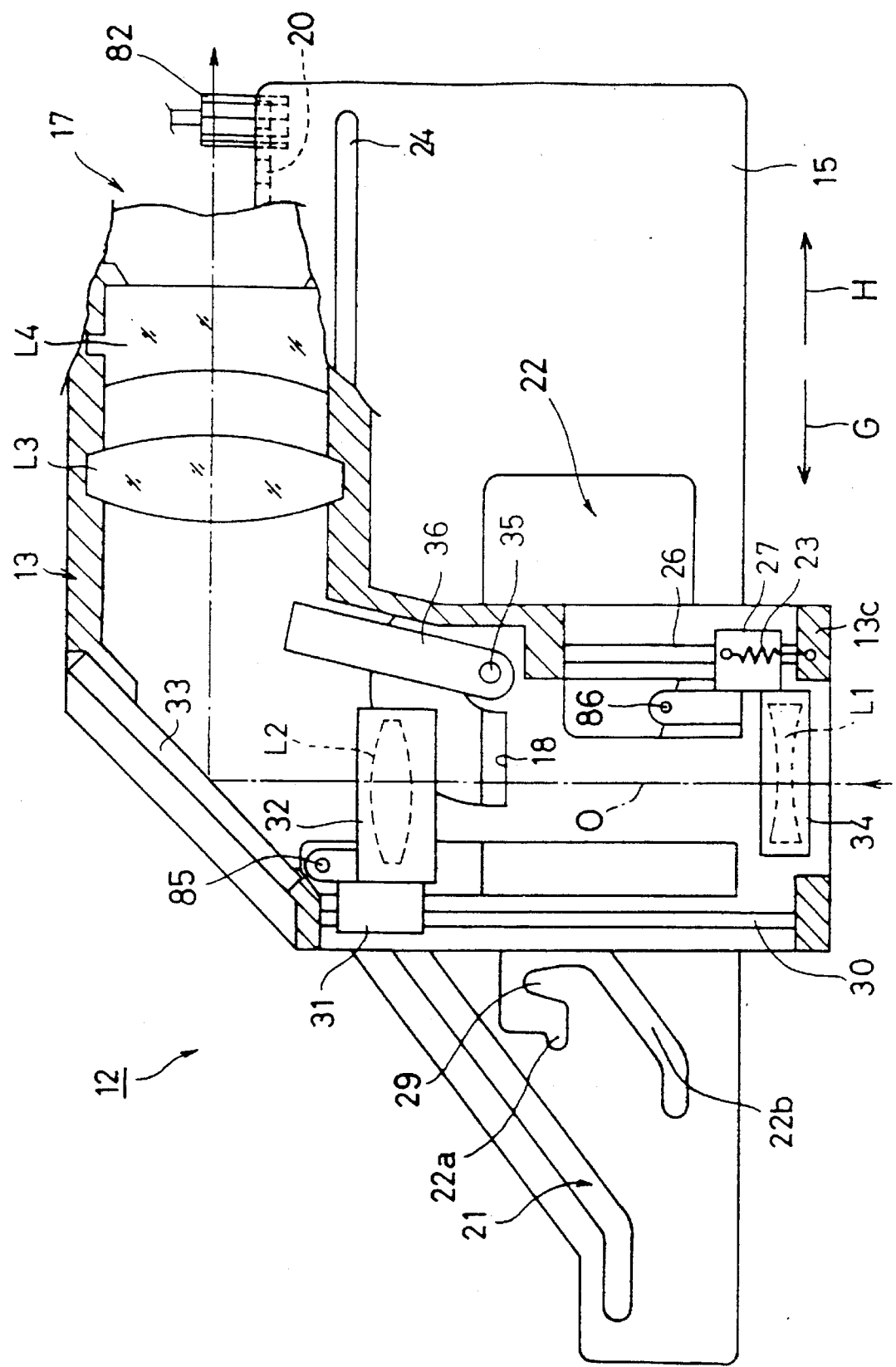
FIG. 2 is a sectional plan view of the zoom finder shown in FIG. 1, when an associated taking lens is in an accommodating section.

As can be seen in FIG. 2, the finder body 13 is generally L-shaped in a plan view and includes a first lens assembly L1 (i.e., objective lens assembly), a second lens assembly L2, a third lens assembly L3, a fourth lens assembly L4, a prism (not shown), and a fifth lens assembly L5 (FIG. 14) in this order from the object side. The third, fourth and fifth lens assemblies L3, L4 and L5 are immovable. The third and fifth lens assemblies L3 and L5 have a positive power and the fourth lens assembly L4 has a negative power.

The first and second lens assemblies L1 and L2 are variable power lens assemblies which are moved in relation to each other in the optical axis direction according to a predetermined relationship. The first lens assembly L1 has a negative power and the second lens assembly L2 has a positive power, respectively. The optical path of the first and second lens assemblies L1 and L2 is substantially perpendicular to the optical path of the third and fourth lens assemblies L3 and L4. Between the optical paths, a reflecting plate 33 is provided, and is inclined at a predetermined angle to bend light transmitted through the first and second lens assemblies L1 and L2 by approximately 90°, so that the light is made incident upon the third, fourth and fifth lens assemblies L3, L4 and L5.

The first lens assembly L1 is held by a first movable lens frame 34 secured to a guide ring 27, so it can move in opposite directions along the optical axis O. The guide ring 27 is movably guided by a guide bar 26 which is provided on one side of the front end of the finder body 13 and extends in the forward and backward directions of the finder body 13. The guide ring 27 is provided with a tensile spring 23 which is connected at its one end to the guide ring 27 and at the other end to a front end position 13c of the finder body 13, so that the guide ring 27 and, accordingly, the first lens assembly L1 are continuously biased forward in the optical axis direction O by the tensile spring 23. The first lens frame 34 is provided with a cam pin 86 which projects downward (i.e., in the direction perpendicular to the sheet of the drawing in FIG. 2) from the finder body 13 and which is moved by a cam plate 15.

The second lens assembly L2 is held by a second movable lens frame 32 secured to a guide ring 31 so as to move along the optical axis O in opposite directions. The guide ring 31 is movably guided by a guide bar 30 which is provided on the other side of the front end of the finder body 13 and extends in the forward and backward directions thereof. The second lens frame 32 is provided with a cam pin 85 which projects downward from the finder body 13 and which is moved by the cam plate 15.

Figure 5:
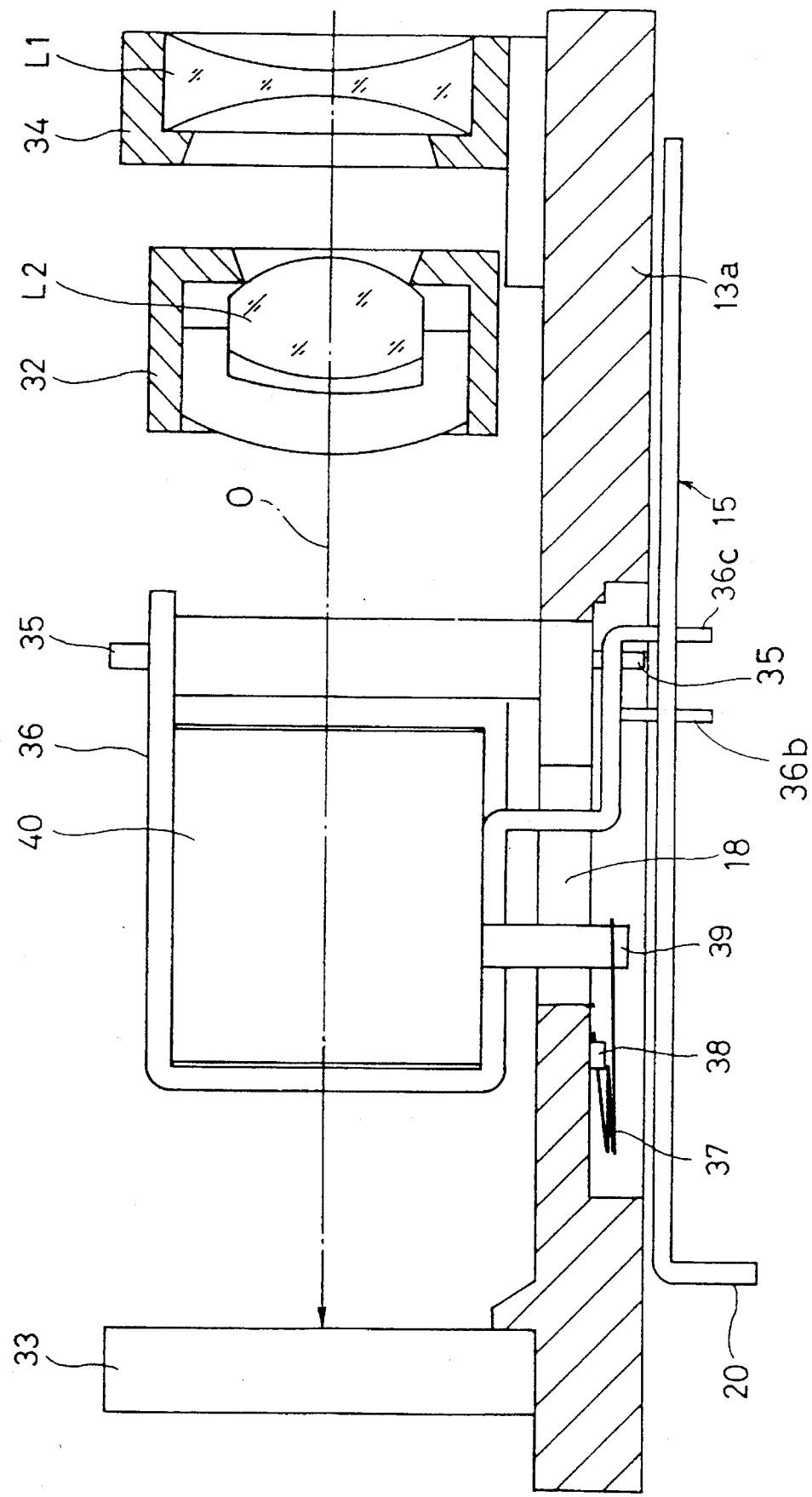
FIG. 5 is an elevated end view of a zoom finder viewed in direction D of FIG. 3.
Figure 6:
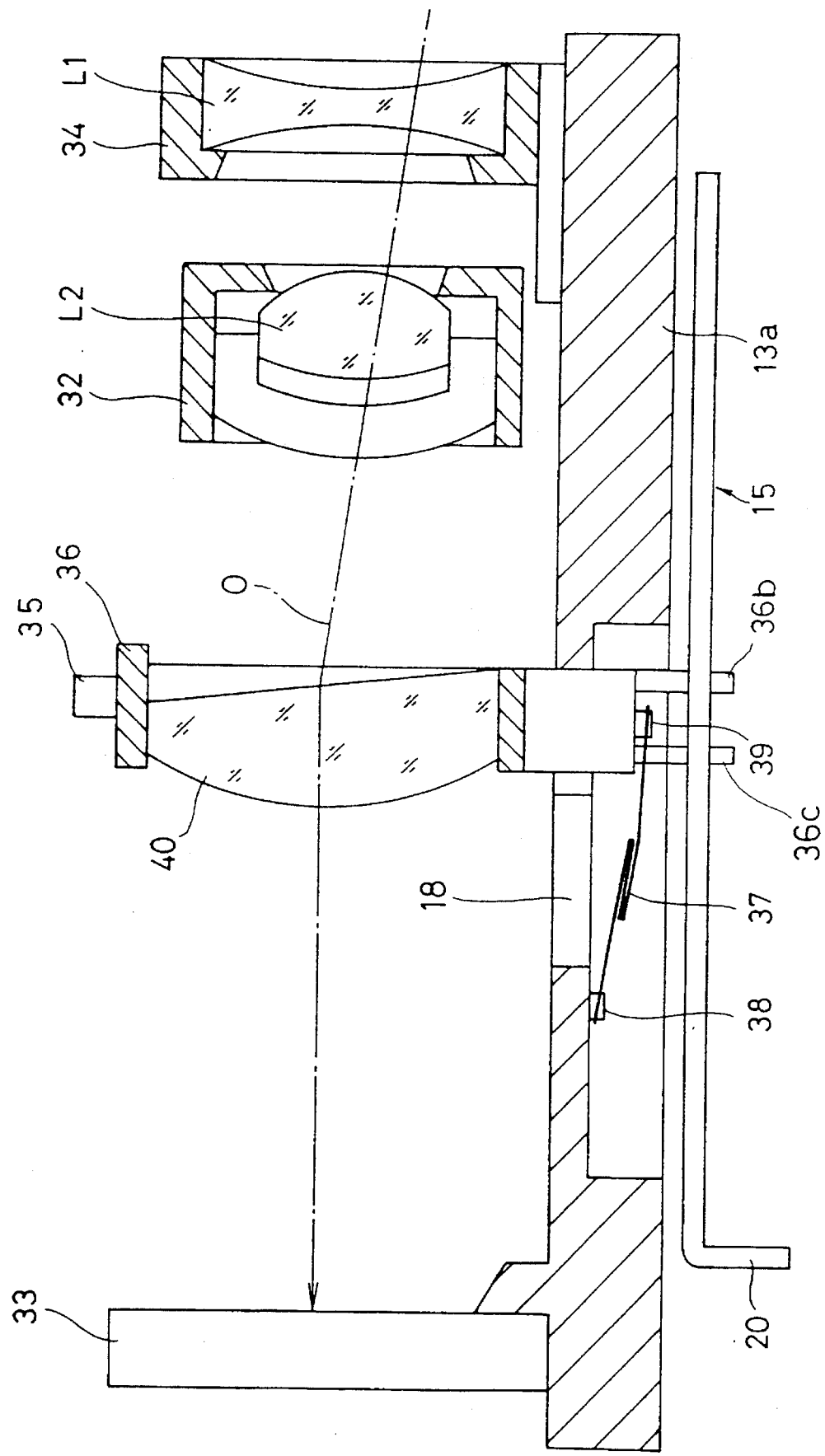
FIG. 6 is an elevated end view of a zoom finder viewed in direction E of FIG. 4.

A prism frame (i.e., parallax error compensating optical member frame) 36 is provided optically behind the guide bar 26 and is rotatable about a pivot shaft 35 which is in turn supported by the finder body 13. A parallax error compensating prism (i.e., a parallax error compensating optical member) 40 is held by the prism frame 36, as can be seen in FIG. 5. Consequently, the parallax error compensating prism 40 is rotatable between a compensating position in which the parallax error compensating prism 40 is in the optical path of the zoom finder optical system and a retracted position in which the parallax error compensating prism 40 is retracted from the optical path of the zoom finder optical system.

The finder body 13 is provided on a lower wall portion 13a thereof, with a sectoral guide groove 18 whose profile corresponds to the locus of the rotational movement of the prism frame 36 (i.e., the parallax error compensating prism 40). The prism frame 36 is provided with a spring engaging projection 39 and a pair of engaging fingers 36b and 36c, that project downward (i.e., in the direction perpendicular to the sheet of the drawing in FIG. 7 or 8) from the guide groove 18. The engaging fingers 36b and 36c are angularly spaced from one another by about 90° with respect to the pivot shaft 35, so that when the prism frame 36 is located in the retracted position shown in FIG. 3, the engaging finger 36c is engaged by a switching pawl 29 which is moved in the direction H in FIG. 7.

Figure 3:
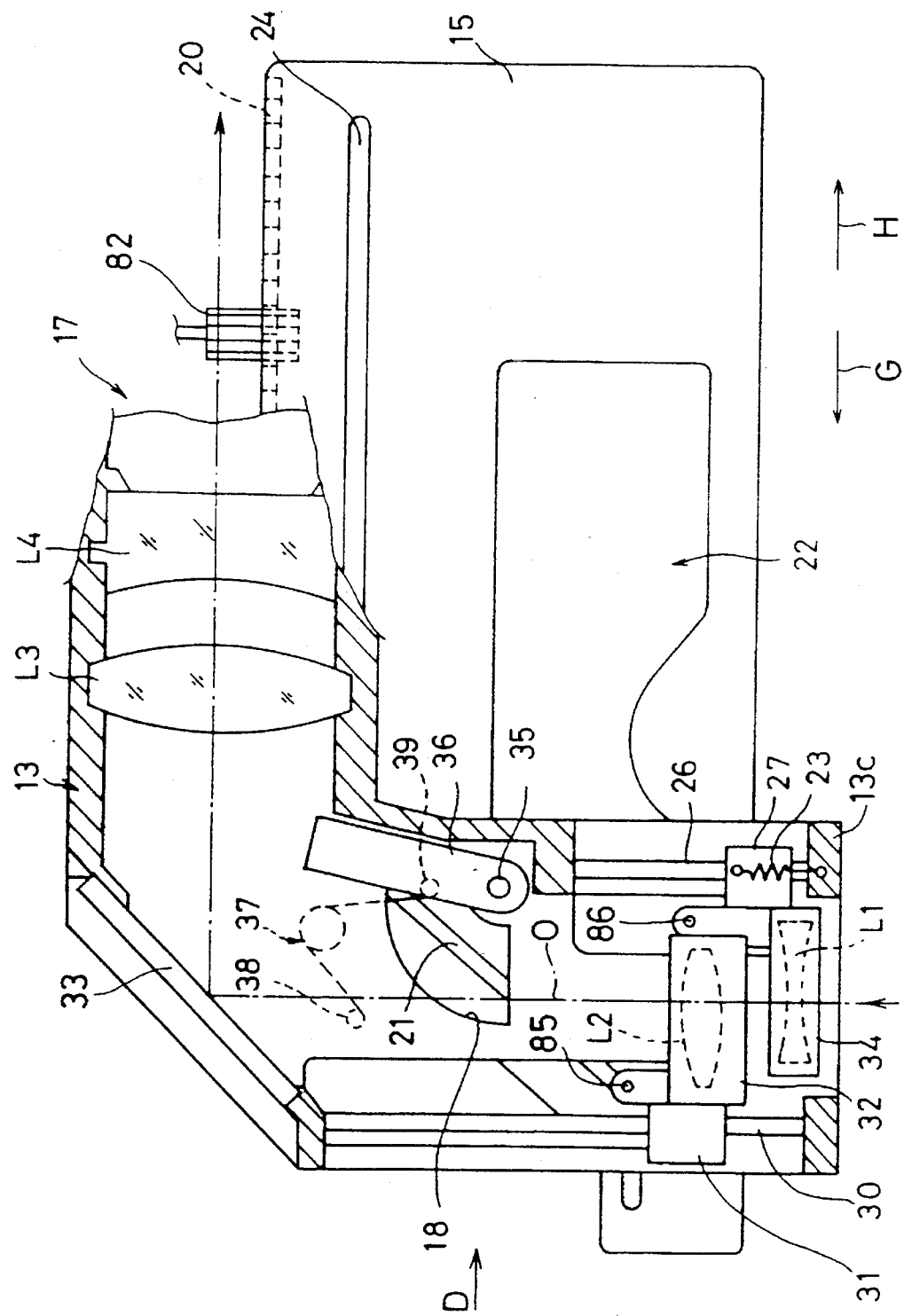
FIG. 3 is a sectional plan view of the zoom finder shown in FIG. 1, in a retracted position in which a parallax error compensating prism is retracted from an optical path of a zoom finder optical system.
Figure 4:
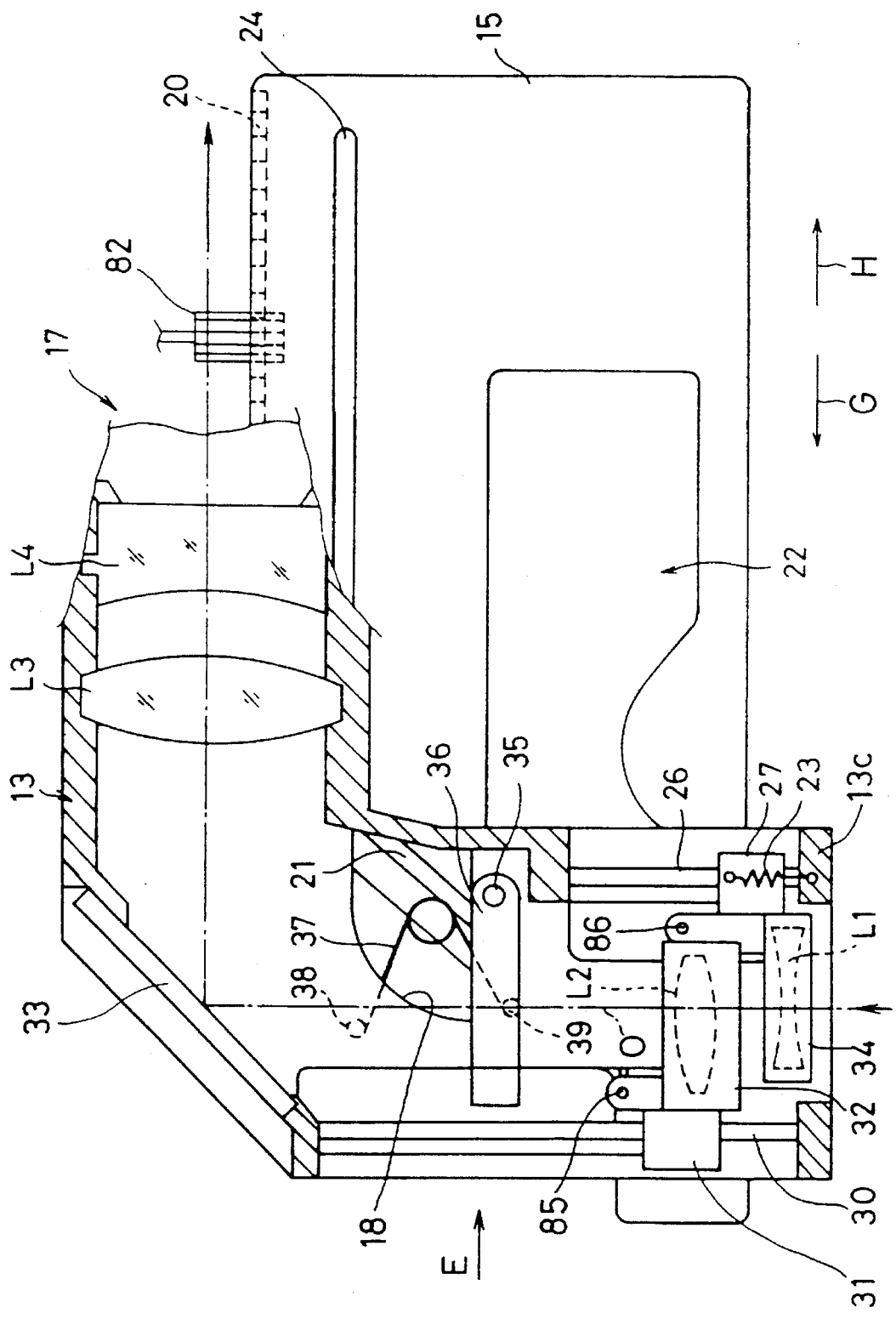
FIG. 4 is a sectional plan view of the zoom finder shown in FIG. 1 in a compensating position in which a parallax error compensating prism is in an optical path of a zoom finder optical system.
Figure 8:
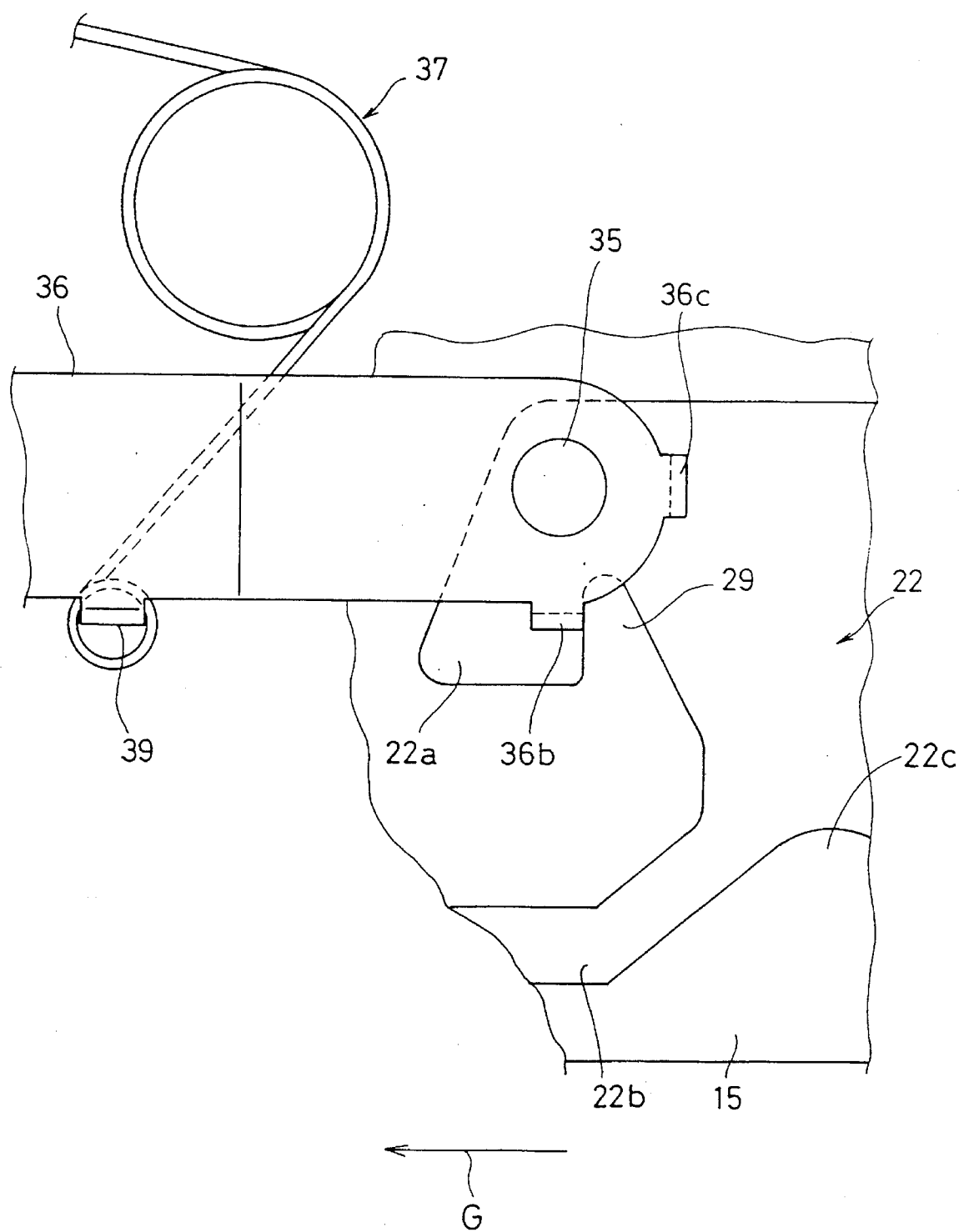
FIG. 8 is an enlarged view of a parallax compensating prism, which is located in an optical path of a zoom finder optical system, and a switching pawl.

When the prism frame 36 is located in the compensating position shown in FIG. 4, the engaging finger 36b is engaged by the switching pawl 29 which is moved in the direction G in FIG. 8. The prism frame 36 is positioned so that when the engaging fingers 36b and 36c are in the retracted position, the prism frame 36 constitutes a diaphragm for the optical path of the finder optical system (FIGS. 2 and 3).

As can be seen in FIG. 5, a first spring engaging projection 38 is provided on the lower wall portion 13a of the finder body 13 on the side opposite to the pivot shaft 35 with respect to the guide groove 18. A second spring engaging projection 39 is angularly moved together with the prism frame 36 within the guide groove 18. A torsion spring 37 is engaged at opposite ends thereof by the first and second spring engaging projections 38 and 39. This constitutes a snap-action mechanism that quickly rotates the prism frame 36 (i.e., parallax error compensating prism 40) to the retracted position or the compensating position, immediately past a point of instability.

Figure 7:
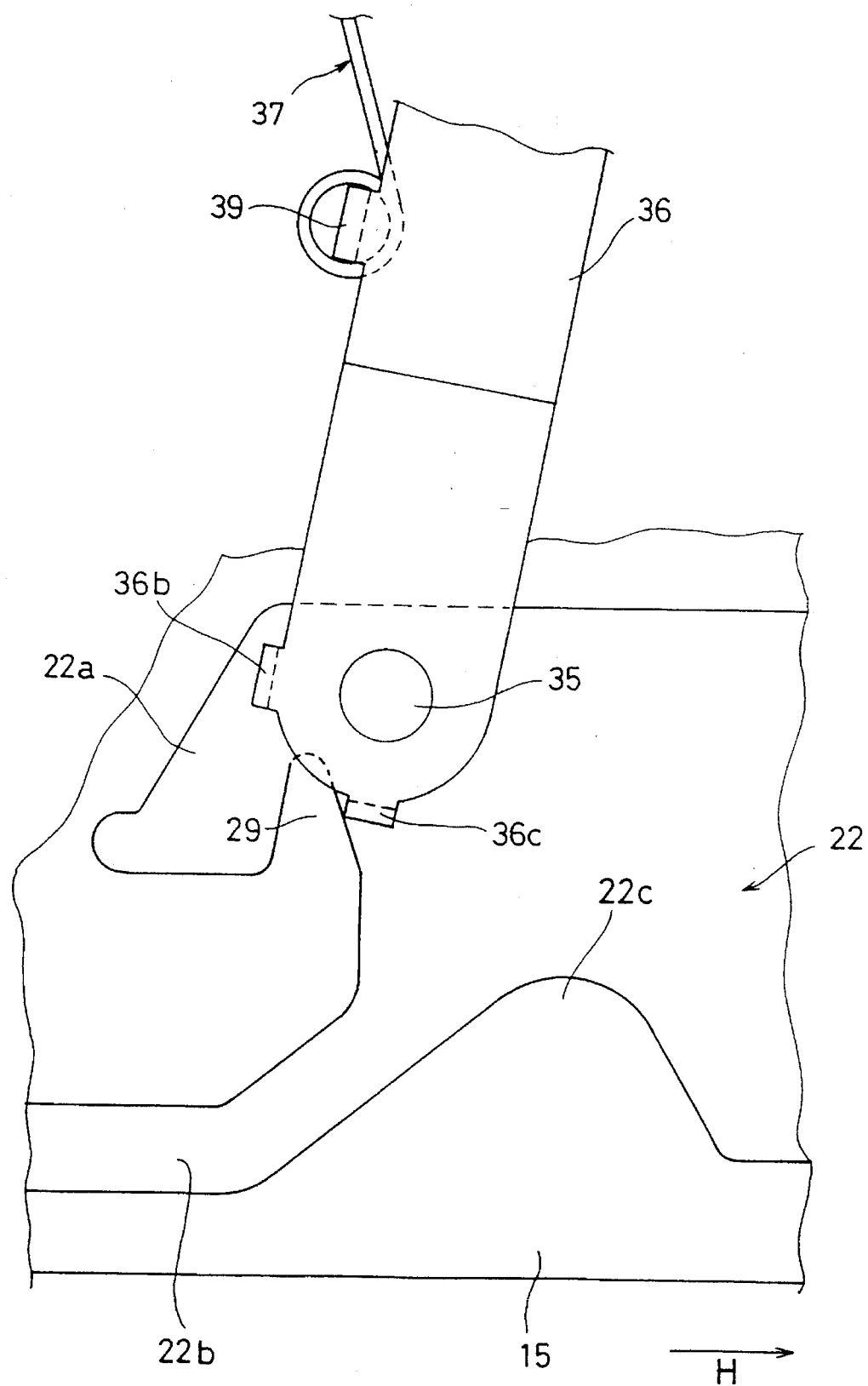
FIG. 7 is an enlarged view of a parallax error compensating prism, which is retracted from an optical path of a zoom finder optical system, and a switching pawl.
Figure 9:
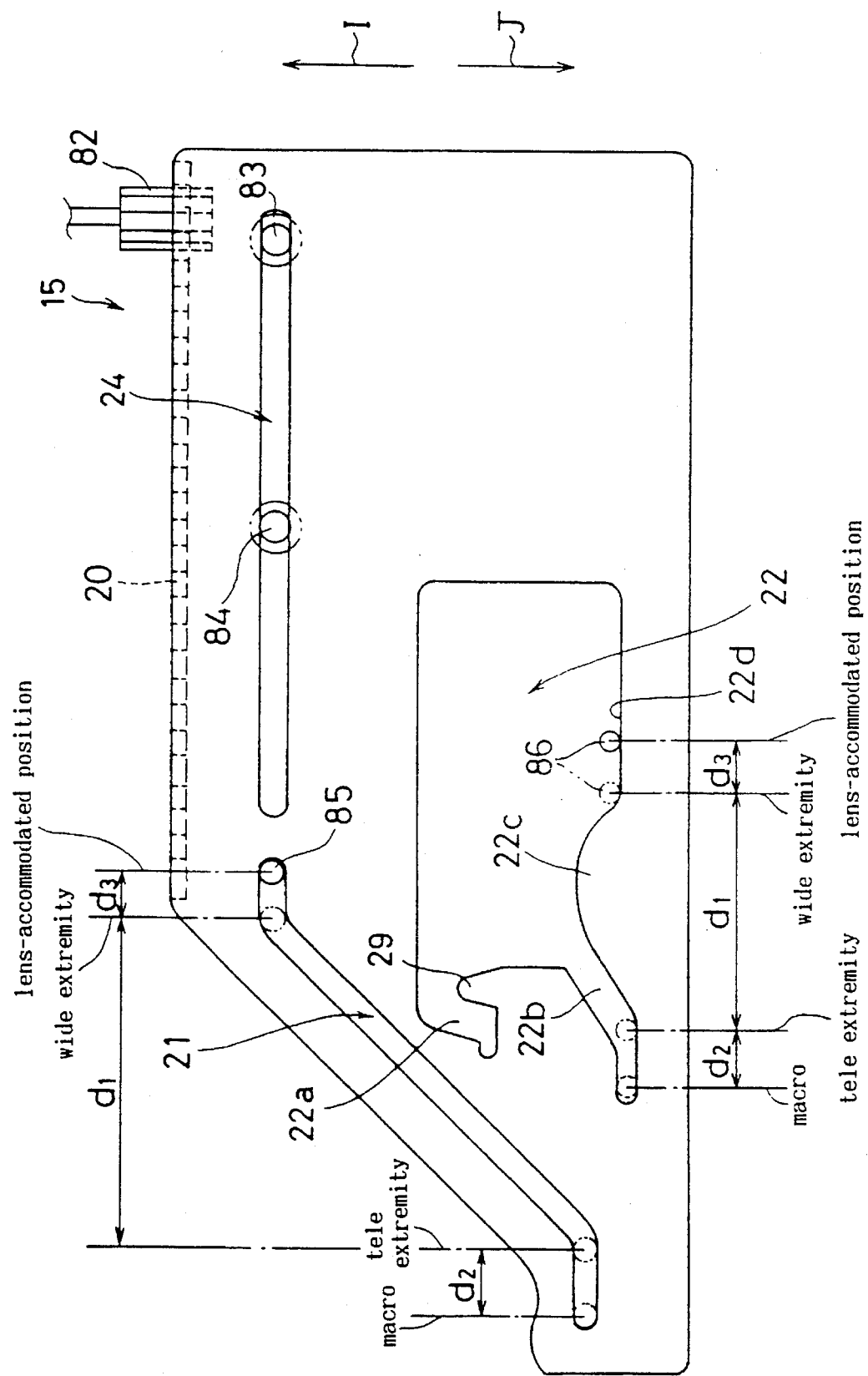
FIG. 9 is a plan view of a single cam plate.

As can be seen in FIG. 9, the switching pawl 29 is integrally provided on the cam plate 15, so that the switching pawl 29 is moved together with the cam plate 15 in opposite directions to apply the rotational force to the prism frame 36 (i.e., parallax error compensating prism 40) towards the point of instability. Consequently, when the macro mode is selected, so that the cam plate 15 is moved towards the macro section (i.e., direction H in FIG. 3), the engaging finger 36c is engaged by the switching pawl 29, whereby the engaging finger 36c is pressed in the same direction (FIG. 7). As a result, the prism frame 36 is rotated in the counter-clockwise direction (FIG. 3) towards the point of instability.

Similarly, when the cam plate 15 is transferred to the zoom photographing section from the macro section (direction G in FIG. 4), the engaging finger 36b is engaged and pressed by the switching pawl 29 in the same direction (FIG. 8). As a result, the prism frame 36 is rotated in the clockwise direction towards the point of instability.

The single cam plate 15 with the finder body 13 is shown in FIG. 9. The cam plate 15 is provided, on one side thereof adjacent to the eyepiece side (direction I), with a rack 20 which is in mesh with a pinion 82 which is provided on the camera body 9 to rotate in association with the zoom photographing optical system. The cam plate 15 is also provided with a guide groove 24 which extends in parallel with the rack 20. Guide pins 83 and 84 secured to the bottom of the finder body 13 and spaced from one another are movably fitted in the guide groove 24. Consequently, the cam plate 15 is guided to move in the lateral direction of the camera 10 within the effective length of the guide groove 24 in accordance with the engagement of the guide pins 83 and 84 in the guide groove 24.

Also, the cam plate 15 is provided with a cam opening 22 and a cam groove 21 in which a cam pin 85 provided on the second lens frame 32 is fitted. The cam opening 22 is comprised of a cam groove portion 22b, cam portions 22c and 22d, and a receptacle portion 22a. A cam pin 86 of the first lens assembly L1 urged towards the object side by the guide ring 27 is guided in the cam opening 22. The switching pawl 29 of the prism frame 36 which selectively engages with the engaging finger 36b or 36c of the prism frame 36 projects into the receptacle portion 22a. The movable (i.e., rotatable) engaging finger 36b is also fitted in the receptacle portion 22a. The cam groove 21 has a taking lens accommodating section d3 in which the first lens frame 34 (first lens assembly L1) and the second lens frame 32 (second lens assembly L2) can be moved or retained.

The taking lens accommodating section d3 of the cam groove 21 and the taking lens accommodating section d3 of the cam opening 22 are linear sections corresponding to the shortest focal length of the zoom photographing optical system. The zoom section d1 of the cam groove 21 is a linear section which is inclined at a predetermined angle with respect to the taking lens accommodating section d3 of the cam groove 21. The zoom section d1 of the cam portion 22c of the cam opening 22 is defined by an oblique or curved profile which corresponds to the inclined zoom section d1 of the cam groove 21. The zoom section d1 of the cam groove 21 and zoom section d1 of the cam opening 22 are for moving the first and second lens assemblies L1 and L2 along the optical axis O, respectively, to vary the magnification thereof in accordance with the magnification of the zoom photographing optical system.

The macro section d2 of the cam groove 21 and the macro section d2 of the cam opening 22 are linear sections, similar to the taking lens accommodating sections d3. When the first and second lens assemblies L1 and L2 are located at the telephoto extremity in the macro sections d2, if the switching pawl 29 is forced against the engaging finger 36c, the prism frame 36 can be rotated in the counterclockwise direction towards a position shown in FIG. 4.

The rack 20, the cam groove 21, the cam opening 22, the guide groove 24, and the switching pawl 29, of the cam plate 15 can be all integrally formed by a press machining per se known.

Figure 12:
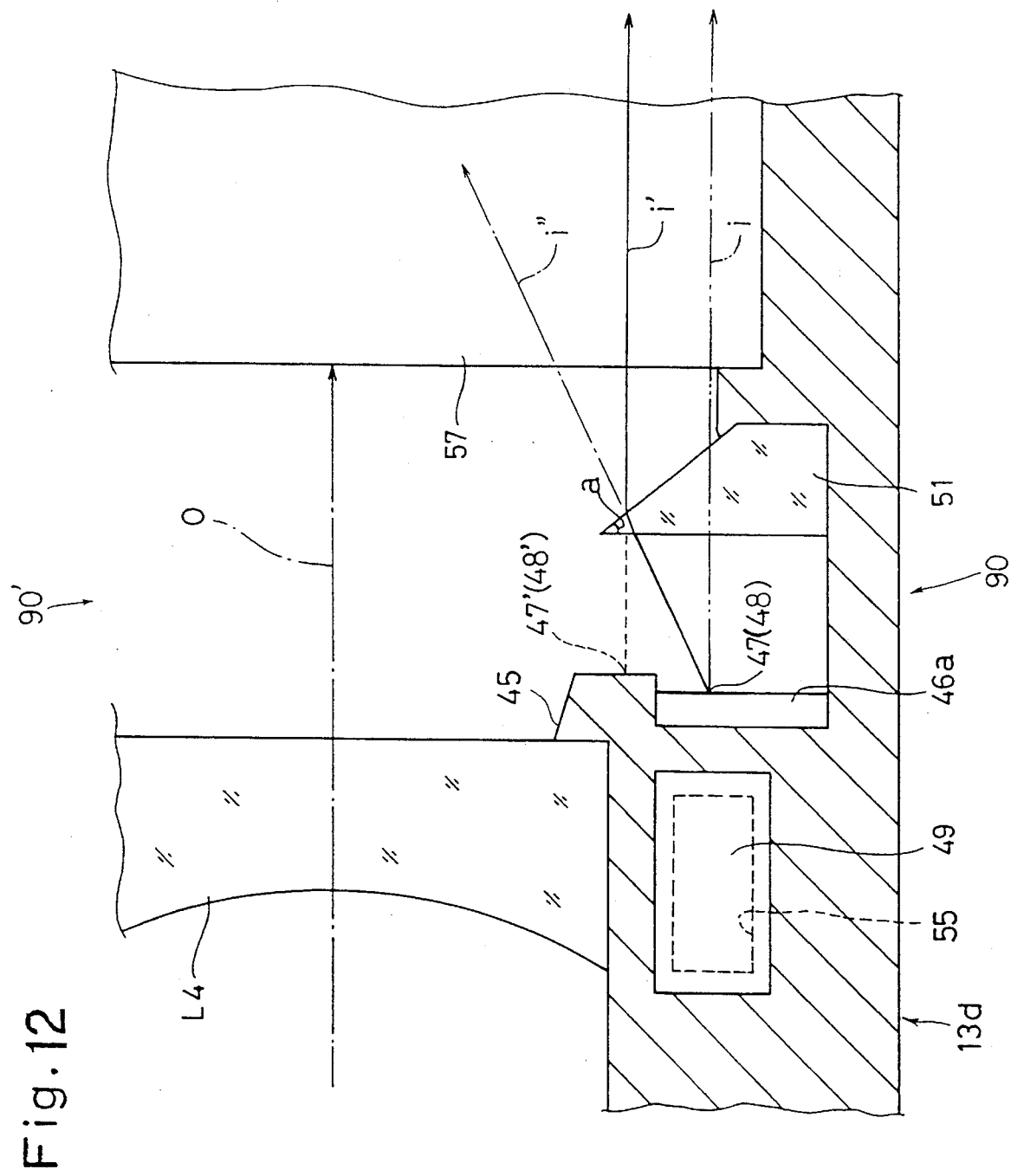
FIG. 12 is an end view in the direction F of FIG. 10.

As shown in FIG. 12, a prism 57 is provided behind the fourth lens assembly L4 to refract light transmitted through the fourth lens assembly L4 towards the view window 17 (FIG. 14) of the finder. Indication mark projecting portions 90 and 90' are provided in a space between the fourth lens assembly L4 and the prism 57 on opposite sides of the fourth lens assembly L4 (i.e., upper and lower portions of the fourth lens assembly L4 in FIG. 12). The indication mark projecting portions 90 and 90' are adapted to project the indication marks onto the right and left sides of the peripheral light intercepting portion of the field frame 45 of the finder optical system in an ordinary posture of the camera.

The indication mark projecting portion 90 projects the indication marks onto a peripheral light intercepting portion X (FIGS. 10 and 13) which is located on the left side of the field frame 45 of the finder optical system in an ordinary posture of the camera. To this end, the indication mark projecting portion 90 is provided with LED fitting holes 55 and 56 that are provided on opposite upper and lower side surfaces of the side wall 13d, respectively. The side wall 13d is provided on one side (i.e., left side in FIG. 10) of the fourth lens assembly L4. The fitting holes 55 and 56 open into the inside of the finder body 13.

The LED fitting hole 55 is formed in a manner such that the beams which are emitted from an LED 49, which is placed in the hole 55, are made to proceed in a direction that is perpendicular to the optical axis O. Similarly, the LED fitting hole 56 is formed in a manner such that the beams which are emitted from an LED 50, which is placed in the hole 56, are made to proceed in a direction which is perpendicular to the optical axis O.

The indication mark projecting portion 90' projects the indication marks onto a peripheral light intercepting portion X' (FIGS. 10 and 13) which is located on the right side of the field frame 45 of the finder optical system in an ordinary posture of the camera. To this end, the indication mark projecting portion 90' is provided with LED fitting holes 55 and 56 that are provided on opposite upper and lower side surfaces of the side wall 13e, respectively. The side wall 13e is provided on the other side (i.e., right side in FIG. 10) of the fourth lens assembly L4. Holes 55 and 56 open into the inside of the finder body 13.

It should be noted that the peripheral light intercepting portions X and X' are observed when the photographer looks into the finder through the fifth lens group L5 (i.e., the eyepiece lens), and that these portions are outside of a photographing area surrounded by the field frame 45.

Figure 10:
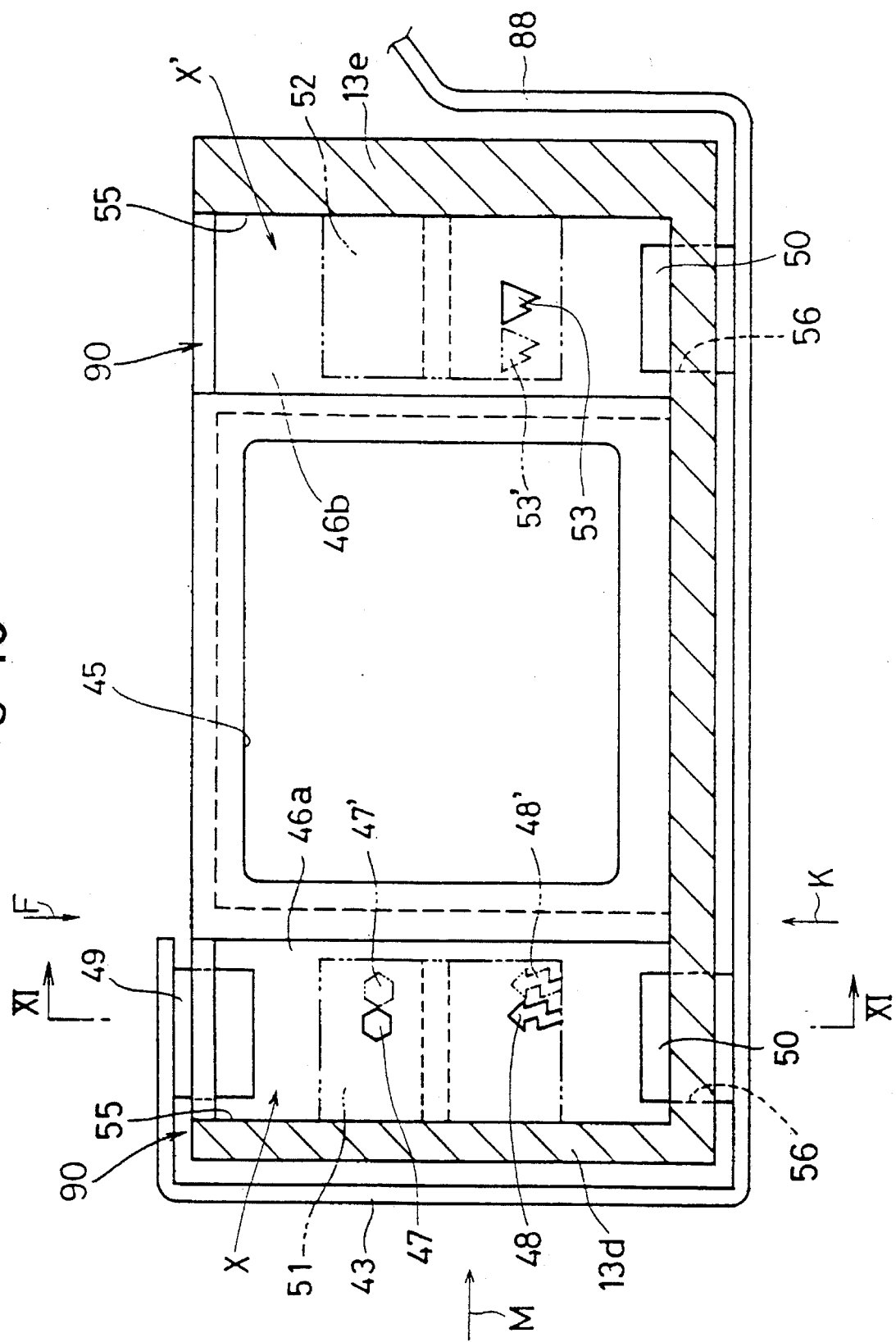
FIG. 10 is an end view of indication marks indicated on a peripheral light intercepting portion of a field frame and an indication approaching prism, viewed from the eyepiece side.
Figure 11:
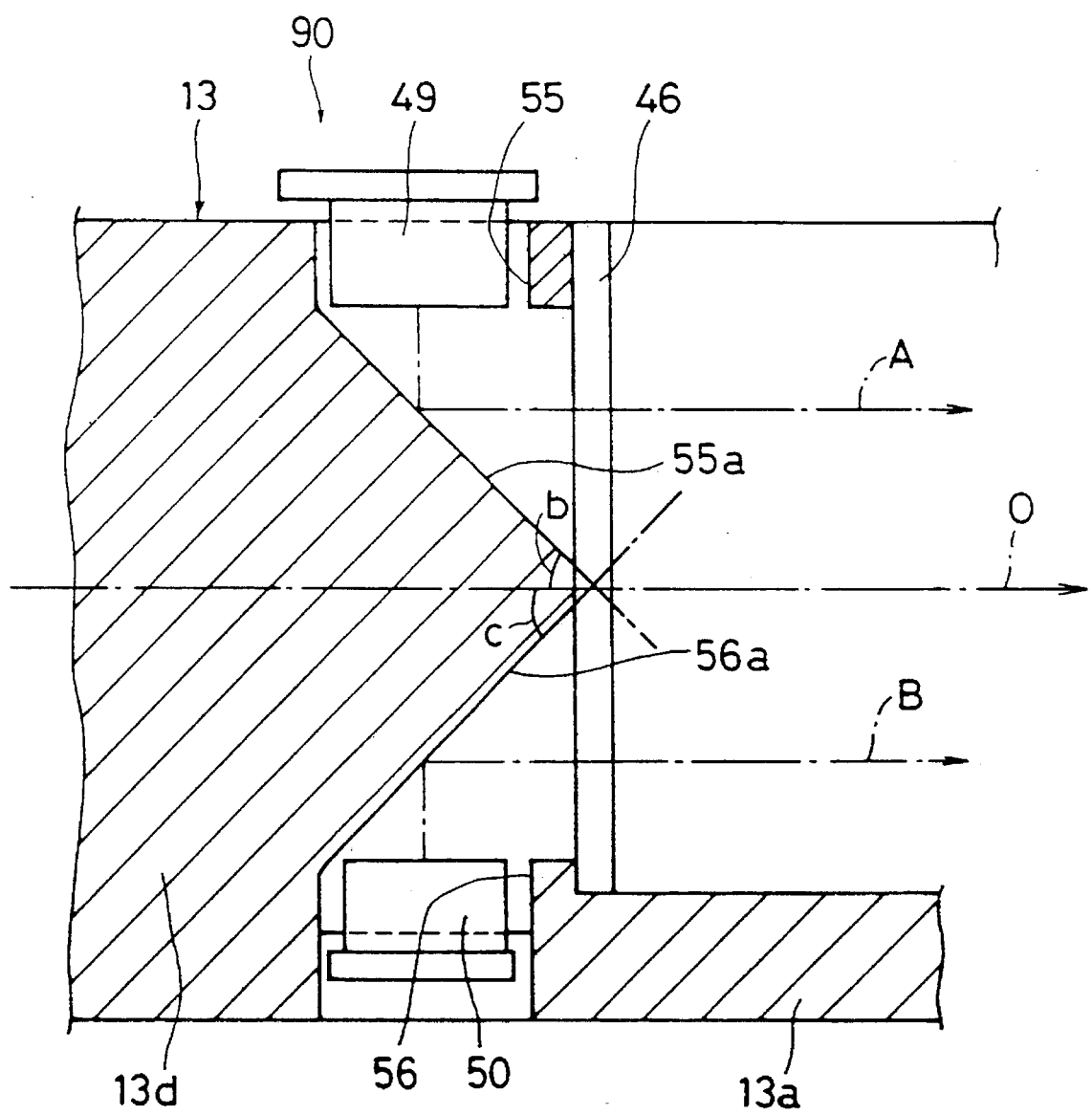
FIG. 11 is a sectional view along the line XI—XI in FIG. 10.

As can be seen from FIGS. 10 and 11, there are reflecting surfaces 55a and 56a within the LED fitting holes 55 and 56 of the indication mark projecting portion 90 to reflect bundles of light (i.e, projection light) A and B emitted from the LED's (i.e., light emitters) 49 and 50 fitted in the respective LED fitting holes 55 and 56. The reflecting surfaces 55a and 56a and the LED fitting holes 55 and 56 are preferably formed integrally with the finder body 13 which is in turn made of a synthetic resin or the like.

The LED's 49 fitted in the LED fitting holes 55 emit light in the direction normal to the optical axis O. The reflecting surface 55a is inclined at 45° (angle =45°) with respect to the optical axis O in FIG. 11. The LED's 50 fitted in the LED fitting holes 56 emit light in the direction normal to the optical axis O. The reflecting surface 56a is inclined at 45° (angle c =45°) with respect to the optical axis O in FIG. 11. Consequently, the reflecting surfaces 55a and 56a change the directions of the bundles of rays "A" and "B" emitted from the respective LED's 49 and 50 by approximately 90° towards the eyepiece side, so that the beams "A" and "B" are parallel with the optical axis O.

Similar to the indication mark projecting portion 90, the indication mark projecting portion 90' is provided with reflecting surfaces 55a and 56a formed integrally with the finder body 13 and located within the LED fitting holes 55 and 56. Note that in the indication mark projecting portion 90', the LED 50 is fitted only in the LED fitting hole 56. There is no LED in the LED fitting hole 55. This is because, on the side of the indication mark projecting portion 90', it is impracticable to provide a space large enough to accommodate the LED. In theory, however, it is of course possible to provide the LED's 49 and 50 within both the LED fitting holes 55 and 56.

The reflecting surface 56a reflects the bundle of rays "B" emitted from the LED 50 within the LED fitting hole 56 at 90° towards the eyepiece side and parallel to the optical axis O of the finder optical system.

The LED fitting holes 55 and 56 of the indication mark projecting portions 90 and 90' are placed in the same plane when viewed in the direction M (FIG. 10), as can be seen in FIG. 11. The LED's 49 and 50 fitted in the LED fitting holes 55 and 56 are connected to a common flexible printed circuit board (hereinafter referred to as an FPC) 88 which surrounds the finder body 13, so that the LED's 49 and 50 can be supplied with electrical power through the FPC 88. The FPC 88, which is bent so as to extend substantially along the contour of the finder body 13, simplifies an electrical wiring layout.

With this arrangement, optical paths along which the projection beams emitted from the LED's 49 and 50 are transmitted to be received by indicating films 46a and 46b are established by the indication mark projecting portions 90 and 90' in which the LED's 49 and 50 are fitted in the corresponding LED fitting holes 55 and 56. As mentioned above, the LED's 49 and 50 can be easily fitted in the corresponding LED fitting holes.

Furthermore, since the reflecting surfaces 55a and 56a are integrally formed-with the finder body 13 upon molding the same, it is not necessary to mount separate reflecting plates to the finder body 13 after the latter is molded, thus resulting in a simple and inexpensive structure.

The indication mark projecting portions 90 and 90' are each provided with the indicating films (i.e., indicating members) 46a and 46b that are located outside the field frame 45 of the finder optical system and on the sides of the LED fitting holes 55 and 56 adjacent to the eyepiece.

The indicating film 46a carries thereon a focus mark 47 which represents an "in-focus" state, and an indication mark 48 which represents a "compulsory light emission". These marks 47 and 48 are formed, for example, by cutting away portions of the indicating film 46a. The marks 47 and 48 are appropriately positioned so as to be illuminated with the bundles of rays "A" and "B" emitted from the LED's 49 and 50.

The indicating film 46b carries thereon an indication mark 53 which represents an "infinite mode". The mark 53 is formed, for example, by cutting away a portion of the indicating film 46b, and is appropriately positioned so as to be illuminated with the bundle of rays emitted from the LED 50.

Indication position varying prisms 51 and 52 are provided between the LED fitting holes 55, 56 and the prism 57 and on the side walls 13d and 13e of the finder body 13, so as not intercept the bundles of rays of the zoom finder optical system, respectively. The indication position varying prisms 51 and 52 secured to the side walls 13d and 13e of the finder body 13 are shaped such that the indication marks mentioned above are placed within the widths of the corresponding indication position varying prisms 51 and 52 in the vertical direction in FIG. 10.

The indication position varying prisms 51 and 52 are located closer to an eyepiece side than the indicating films 46a and 46b and have apexes of an angle "a" (FIG. 12) adjacent to the optical axis O of the zoom finder optical system. Consequently, as shown in FIG. 10 which is an end view viewed from the view window 17 of the view finder, the indication position varying prisms 51 (52) shifts light rays, for example, in the direction shown by solid line i' (FIG 12), which are emitted from the indicating film 46a (46b). Referring to FIG. 12, the light rays form images of indication marks 47' and 48' (53') at positions close to the finder optical axis O. If the indication position varying prism 51 (52) were not provided, light rays emitted from the indicating film 46a (46b) in the direction shown by double dotted and dashed line i would form images of the indication marks 47 and 48 (53) farther away from the optical axis. In other words, in the case that the indication position varying prism 51 (52) is not provided, the viewer (i.e., photographer) would observe images of the indication marks 47 and 48 (53) as shown in FIG. 10, which are formed by the light rays of direction i. However, due to the fact that the indication position varying prism 51 (52) is provided, the images formed by light rays which are emitted in the direction shown by dotted and dashed line i", which would not be observed in the absence of the indication position varying prism 51 (52), can be observed since the light rays of direction i" are bent in the direction i' by the indication position varying prism 51 (52). Therefore, the viewer can observe images of the indication marks 47' and 48' (53') formed by the light rays emitted in the direction i'. Consequently, the viewer can observe images of the indication marks 47' and 48' (53') at positions closer to the center of the field frame 45, as opposed to the images of indication marks 47 and 48 (53) which would be observed in the absence of the indication position varying prism 51 (52). The image of the indication mark 53 in the indication mark projecting portion 90' can be observed in a similar manner to the indication marks 47 and 48 due to the indication position varying prism 52, not shown in FIG. 12.

In the zoom finder as constructed above, according to the present invention, when the cam pins 85 and 86 are moved to the respective taking lens accommodating sections d3 in association with the drive of the zoom photographing optical system, so that the zoom finder optical system is located at the wide angle extremity, as can be seen in FIG. 2, the first and second lens assemblies L1 and L2 are spaced farthest from one another. In this state, the prism frame 36 is rotated about the pivot shaft 35 to come to the retracted position in which the prism frame 36 does not intercept the bundle of rays for the zoom finder optical system.

When the zoom photographing optical system is moved to the zoom section, the pinion 82 which is rotated in association therewith moves the cam plate 15 in the direction H in FIG. 2 through the rack 20 which is in mesh with the pinion 82. Consequently, cam pin 85 is moved towards the object side (direction J) within the zoom section d1 (FIG. 9), while being guided by the cam groove 1, and the cam pin 86 is guided by the cam portion 22c to once move towards the eyepiece side (direction I) and then move towards the object side (direction J) again (FIG. 3).

As can be understood from the foregoing, since the first and second lens assemblies L1 and L2 that are variable power lens assemblies are moved in the optical axis direction O while keeping a predetermined relationship, the power (magnification) of the zoom finder optical system can be varied in accordance with the magnification of the zoom photographing optical system.

Upon transfer to the macro section d2 (FIG. 9), when a further movement of the cam plate 15 occurs in the direction H in FIG. 3, the switching pawl 29 of the cam plate 15 comes into engagement with the engaging finger 36c of the prism frame 36 to press the same in the direction H at the telephoto extremity at which the first and second lens assemblies L1 and L2 are located (FIG. 7).

Consequently, the prism frame 36 is quickly rotated in the counterclockwise direction in FIG. 3 by the snap-action mechanism as soon as it passes the point of instability, as mentioned above, so that the parallax error compensating prism 40 is moved to and stably held in the compensating position shown in FIG. 4, i.e., within the optical path of the zoom finder optical system to correct the parallax error.

Upon transfer from the macro section d2 to the zoom section d1, when the cam plate 15 is moved in the direction G in FIG. 4, the switching pawl 29 of the cam plate 15 comes into engagement with the engaging finger 36b of the prism frame 36 to press the same in the direction G (FIG. 8).

Consequently, the prism frame 36 is quickly rotated in the clockwise direction in FIG. 4 by the snap-action mechanism as soon as it passes the point of instability. Hence, the parallax error compensating prism 40 is quickly rotated to and stably held in the retracted position shown in FIG. 3.

Although the above discussion has been directed to a lens shutter type of camera 10 to which the present invention is applied, the present invention is not limited thereto. For instance, the present invention can be applied to a single lens reflex camera or the like.

As can be understood from the foregoing, according to the present invention, the indicating members having indication marks are provided outside of the field frame of the finder optical system and the prisms having apexes protruding towards the optical axis of the finder optical system are provided closer to the eyepiece side than the indicating members. With this arrangement, the images of the indication marks of the indicating members are shifted towards the center of the field frame, i.e., towards the optical axis of the finder optical system. Hence, the indication marks on the peripheral light intercepting portion of the field frame can be viewed at positions closer to the field frame than the positions at which the images of the indication marks would be otherwise indicated.

Although the invention has been described with reference to particular means, materials and embodiments, it is to be understood that the invention is not limited to the particulars disclosed and extends to all equivalents within the scope of the claims.

I claim:

1. A view finder of a camera in which an image of an indication mark is observed through an eyepiece lens in a peripheral light intercepting portion of a field frame of a finder optical system, comprising:

at least one indicating member provided outside said field frame of said finder optical system and having at least one indication mark for projection; and, at least one prism which is located between said eyepiece lens of said viewfinder and said indicating member and which has an apex protruding towards an optical axis of said finder optical system, wherein light emitted from said at least one indicating member is transmitted through said prism so as to shift said image of said indication mark viewed through said eyepiece lens towards said optical axis of said finder optical system.

2. The view finder of claim 1, further comprising:

a finder body which defines an optical path of said finder optical system.

3. The view finder of claim 2, further comprising:

at least one light emitter which is provided at said peripheral light intercepting portion of said field frame of said finder optical system to emit light to project at least one indication mark of said indicating member.

4. The view finder of claim 1, wherein said at least one prism is positioned so as not to intercept a bundle of rays within said field frame of said finder optical system.

5. The view finder of claim 1, wherein said at least one indication mark is observed in said peripheral light intercepting portion of said field frame on at least left or right sides of said camera in a front elevational view.

6. The view finder of claim 1, wherein said at least one prism is provided in said peripheral light intercepting portion of said field frame on at least left or right sides of said camera in a front elevational view.

7. The view finder of claim 1, wherein said indicating member is provided with an array of indication marks which are formed by cut-away portions of said indicating member.

8. The view finder of claim 2, wherein said at least one prism is secured to said finder body.

9. A view finder of a camera in which indication mark images are observed through an eyepiece lens in a peripheral light intercepting portion of a field frame of a finder optical system, comprising:

indicating members provided outside said field frame of said finder optical system and having indication marks for projection; and, prisms which are located between an eyepiece of said viewfinder and said indicating members and which have apexes protruding towards an optical axis of said finder optical system, wherein light emitted from said indicating members is transmitted through said prisms associated with said indicating members so as to shift images of said indication marks observed through said eyepiece lens towards said optical axis of said finder optical system.

10. The view finder of claim 9, wherein said prisms are provided in said peripheral light intercepting portion of said field frame on left and right sides of said camera in a front elevational view.

11. The view finder of claim 10, further comprising:

a finder body which defines an optical path of said finder optical system, wherein said prisms are secured to said finder body.

12. The view finder of a camera according to claim 1, said light emitted from said at least one indicating member and transmitted through said prism comprising an image of said at least one indication mark.

13. The view finder of a camera according to claim 9, said light emitted from said indicating members and transmitted through said prisms comprising images of said indication marks.

* * * * *